United States Patent
Mandal et al.

(10) Patent No.: US 10,563,114 B2
(45) Date of Patent: Feb. 18, 2020

(54) CORROSION INHIBITOR COMPOSITION FOR PIPELINES

(71) Applicant: INDIAN OIL CORPORATION LIMITED, Mumbai (IN)

(72) Inventors: Tanmay Mandal, Faridabad (IN); Meeta Sharma, Faridabad (IN); Prakash Shanti, Faridabad (IN); Anil Yadav, Faridabad (IN); Ajay Kumar Arora, Faridabad (IN); Suresh Kumar Puri, Faridabad (IN); Sanjiv Kumar Mazumdar, Faridabad (IN); Ramadoss Suresh, Faridabad (IN)

(73) Assignee: INDIAN OIL CORPORATION LIMITED, Mumbai (IN)

( * ) Notice: Subject to any disclaimer, the term of this patent is extended or adjusted under 35 U.S.C. 154(b) by 79 days.

(21) Appl. No.: 15/921,598

(22) Filed: Mar. 14, 2018

(65) Prior Publication Data
US 2019/0031944 A1   Jan. 31, 2019

(30) Foreign Application Priority Data
Jul. 27, 2017   (IN) .............................. 201721026725

(51) Int. Cl.
| | | |
|---|---|---|
| *C09K 8/54* | (2006.01) | |
| *F16L 58/00* | (2006.01) | |
| *C23F 11/12* | (2006.01) | |
| *C23F 11/14* | (2006.01) | |
| *C23F 11/10* | (2006.01) | |

(52) U.S. Cl.
CPC ................ *C09K 8/54* (2013.01); *C23F 11/10* (2013.01); *C23F 11/126* (2013.01); *C23F 11/128* (2013.01); *C23F 11/141* (2013.01); *F16L 58/00* (2013.01)

(58) Field of Classification Search
CPC .......... C09K 8/54; C23F 11/10; C23F 11/126; C23F 11/128; C23F 11/141; F16L 58/00
See application file for complete search history.

(56) References Cited

U.S. PATENT DOCUMENTS

| | | |
|---|---|---|
| 2,668,100 A | 2/1954 | Luvisi |
| 2,736,658 A | 2/1956 | Pfohl |
| 2,944,968 A | 7/1960 | Hutchison |
| 4,028,117 A | 6/1977 | Moat |
| 4,148,605 A | 4/1979 | Andress, Jr. |
| 4,214,876 A | 7/1980 | Garth et al. |
| 5,853,619 A | 12/1998 | Watson et al. |
| 6,103,927 A * | 8/2000 | De Castro Loureiro Barreto Rosa ...................... C07C 67/38 560/207 |

FOREIGN PATENT DOCUMENTS

WO   WO-2018197808 A1 *  11/2018   ........... C07C 69/017

* cited by examiner

*Primary Examiner* — Alicia Bland
(74) *Attorney, Agent, or Firm* — Maschoff Brennan

(57) ABSTRACT

The present invention relates to the low cost high performing corrosion inhibitor composition and process for preparation thereof. The corrosion inhibitor comprises of an ester of cashew nut shell liquid (CNSL), a dimer fatty acid (DFA), a long chain amine and a solvent. The corrosion inhibitor composition prevents corrosion of internal metal surface of pipelines due to petroleum products.

23 Claims, No Drawings

CORROSION INHIBITOR COMPOSITION FOR PIPELINES

FIELD OF THE INVENTION

The present invention relates to development of corrosion inhibitor composition used for internal corrosion protection of pipelines during transportation and storage of hydrocarbons fluids.

BACKGROUND OF THE INVENTION

In the petroleum industry, the uses of corrosion inhibitors are meant to control corrosion of metals in a wide variety of mediums and conditions. The interaction between the active component and the metallic surface plays a determining role in its development and consequently in the corrosion control. The aforesaid interaction depends mainly on the chemical properties of the active compound thereby depending on its molecular structure, on physical and chemical properties of the metal and its interaction with the surrounding medium.

In the particular case of transportation of petroleum products through pipelines or other means such as tankers, the corrosion occurs due to the presence of water and dissolved gases in the products. The use of inhibitors such as nitrogenous compounds i.e., ammonium quaternary salts, amines, amides and including amino acids, organic polycarboxylic acids particularly the use of fat imidazolines and fat amines as corrosion inhibitors in the petroleum industry is well known.

U.S. Pat. No. 2,668,100 discloses that certain carbocyclic monocarboxy acid salts of glyoxalidines are effective corrosion inhibitor for hydrocarbon liquids. The corrosion inhibitor is applied in higher concentration of 25-50 ppm to get better corrosion inhibition.

U.S. Pat. No. 2,944,968 discloses the use of diamides as ferrous metal corrosion inhibitor for hydrocarbon fluids. These diamides were synthesized from polyalkyleneamines and monocarboxy acid. The alkylene part of the polyalkyleneamines may contain as many as six carbon atoms.

U.S. Pat. No. 2,736,658 describes the invention of a class of organic compound to protect ferrous metal surfaces from corrosion. They have designed a class of organic amine and acid salt prepared from N-aliphatic or alicyclic substituted polymethylene diamines those contains aliphatic or alicyclic carbon chain of 8 to 22 and from 2 to 10 number of methylene groups with a resin acid or fatty acid.

U.S. Pat. No. 4,148,605 discloses a dicarboxylic ester-acid obtained from the condensation of an alkenylsuccinic anhydride with an aliphatic hydroxy acid having from 2 to about 18 carbon atoms and amine salts of said ester-acid are useful as rust or corrosion inhibitors for metal surfaces which is in contact with organic media such petroleum distillate hydrocarbon fuels.

U.S. Pat. No. 4,214,876 discloses an improved corrosion inhibitor composition for hydrocarbon fuels. This corrosion inhibitor consisting of mixtures of (a) about 75 to 95 weight percent of a polymerized unsaturated aliphatic monocarboxylic acid having about 16 to 18 carbons, and (b) about 5 to 25 weight percent of a monoalkenylsuccinic acid wherein the alkenyl group has 8 to 18 numbers of carbon atom.

U.S. Pat. No. 5,853,619 discloses the use of corrosion inhibitor for ferrous metal in oil and gas-field application. The corrosion inhibitor comprises of (A) mercaptocarboxylic acid having 2 to 6 carbon atoms, and (B) a polyamine/fatty acid/carboxylic acid adduct. Their preferred combination of (A) and (B) includes mercaptoacetic acid and ethylenetetramine/tall oil acid/acrylic acid adduct. A number of additives have already been reported as corrosion inhibitor for pipelines.

U.S. Pat. No. 4,028,117 discloses development of an improved corrosion inhibitor for pipelines used in transportation of hydrocarbon liquids such as crude petroleum or refined petroleum fractions. The developed corrosion inhibitor comprises of a mixture of (a) 1.8 to 25 parts by weight of dimerized unsaturated fatty acid, and (b) 1 part by weight of an alkoxylated alkyl phenol.

From the above prior arts, it is evident that researchers have in the past developed several products based on polycarboxylic acids, amide or mixture of amine salt of dimer fatty acid. Most of those commercial corrosion inhibitors are not effective at dosage rate in the range of 6 to 23 ppm. Therefore, finding a high performing cost effective product for application as corrosion inhibitor is well desired.

SUMMARY OF THE INVENTION

This summary is provided to introduce a selection of concepts in a simplified format that are further described in the detailed description of the invention. This summary is not intended to identify key or essential inventive concepts of the claimed subject matter, nor is it intended for determining the scope of the claimed subject matter.

The present invention as embodied and broadly described herein discloses a corrosion inhibitor composition for transportation and storage of petroleum products, said corrosion inhibitor comprises a ester of cashew nut shell liquid, a dimer fatty acid (DFA), a long chain amine and a solvent.

An aspect of the present invention is to provide a process for preparation of the corrosion inhibitor composition as disclosed in present invention, said process involves dissolving a dimer fatty acid in a solvent to obtain a mixture (i), adding an alkyl amine to the mixture (i) in drop wise manner to obtain a mixture (ii), stirring the mixture (ii) at a temperature (x), adding ester of cashew nut shell liquid to the mixture (ii) to obtain a mixture (iii), and stirring the mixture (iii) at a temperature (y) to obtain the corrosion inhibitor.

Another aspect of the present invention is to provide a process for protecting pipeline from internal corrosion due to a petroleum product, said process comprises adding the corrosion inhibitor as disclosed in present invention to the petroleum product to be stored or transported.

The developed corrosion inhibitor composition contains a co-reagent which facilitates layer formation of the corrosion inhibiting chemical on the metal surface and prevents the corrosion of metal surface even at lower dosage.

OBJECT OF THE INVENTION

It is the primary object of the invention to provide a corrosion inhibitor composition which is effective to protect internal metal surface of pipelines from corrosion during the transportation and storage of hydrocarbon fluids such as naphtha, kerosene, MS (Motor Spirit) and diesel etc.

It is further object of the invention to disclose the method for preparation of the disclosed corrosion inhibitor composition.

It is further object of the invention to disclose the process for protecting pipelines from internal corrosion due to petroleum products.

DETAILED DESCRIPTION OF THE INVENTION

It should be understood at the outset that although illustrative implementations of the embodiments of the present disclosure are illustrated below, the present invention may be implemented using any number of techniques, whether currently known or in existence. The present disclosure should in no way be limited to the illustrative implementations, and techniques illustrated below, but may be modified within the scope of the appended claims along with their full scope of equivalents.

The terminology and structure employed herein is for describing, teaching and illuminating some embodiments and their specific features and elements and does not limit, restrict or reduce the scope of the claims or their equivalents.

Reference throughout this specification to "an aspect", "another aspect" or similar language means that a particular feature, structure, or characteristic described in connection with the embodiment is included in at least one embodiment of the present invention. Thus, appearances of the phrase "in an embodiment", "in another embodiment" and similar language throughout this specification may, but do not necessarily, all refer to the same embodiment.

The terms "comprises", "comprising", or any other variations thereof, are intended to cover a non-exclusive inclusion, such that a process or method that comprises a list of steps does not include only those steps but may include other steps not expressly listed or inherent to such process or method. Similarly, one or more elements or structures or components proceeded by "comprises . . . a" does not, without more constraints, preclude the existence of other elements or other structures or other components or additional structures or additional components.

Unless otherwise defined, all technical and scientific terms used herein have the same meaning as commonly understood by one of ordinary skilled in the art to which this invention belongs. The composition, process, and examples provided herein are illustrative only and not intended to be limiting. Embodiments of the present invention will be described below in detail.

Any particular and all details set forth herein are used in the context of some embodiments and therefore should NOT be necessarily taken as limiting factors to the attached claims. The attached claims and their legal equivalents can be realized in the context of embodiments other than the ones used as illustrative examples in the description below.

The corrosion inhibitor composition as described herein is based on esters of naturally occurring alkylated phenol viz. Cashew nut shell liquid, a renewable and biodegradable product from vegetable sources as an effective co-reagent in the corrosion inhibiting composition which facilitates better bonding of corrosion inhibitor with metal surface to improve corrosion protection.

Cashew nut shell liquid (CNSL) suitable for use herein occurs as a reddish brown viscous liquid in the soft honeycomb structure of the shell of cashewnut, a plantation product obtained from the cashew nut tree, Anacardium Occidentale L. Native to Brazil the tree grows in the coastal area of Asia and Africa. Cashewnut attached to cashew apple is grey colored, kidney shaped and 2.5-4 cm long. The shell is about 0.3 cm thick, having a soft leathery outer skin and a thin hard inner skin. Between these skins is the honeycomb structure containing the phenolic material popularly called CNSL. Inside the shell is kernel wrapped in a thin brown skin known as the testa.

The nut thus consists of the kernel (20-25%) the shell liquid (20-25%) and the testa (2%) and the rest being the shell. CNSL extracted with low boiling petroleum ether, contain about 90% an anacardic acid and about 10% cardanol. CNSL on distillation gives a pale yellow phenolic derivative, which are a mixture of biodegradable saturated and unsaturated m-alkyl phenols, including cardanol.

In an embodiment, a corrosion inhibitor composition is disclosed comprising a ester of cashew nut shell liquid (CNSL) represented by formula (I):

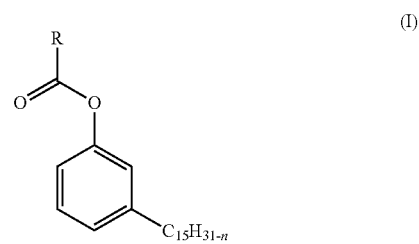

wherein, R is in the range C13 to C17 and n is 0 or 2 or 4 or 6; a dimer fatty acid (DFA); a long chain amine; and a solvent.

According to an aspect of the present subject matter, in said embodiment the ester of cashew nut shell liquid (CSNL) is present in the range of 0.01 to 10% by weight.

According to an aspect of the present subject matter, in said embodiment the dimer fatty acid (DFA) is present in the range of 50 to 95% by weight.

According to an aspect of the present subject matter, in said embodiment the long chain amine is present in the range of 0.1 to 20% by weight.

According to an aspect of the present subject matter, in said embodiment the solvent is present in the range of 10 to 45% by weight.

According to an aspect of the present subject matter, in said embodiment the dimer fatty acid (DFA) is having alkyl chain of carbon atoms in the range of 30 to 50.

According to an aspect of the present subject matter, in said embodiment the dimer fatty acid (DFA) is a mixture of fatty acids having alkyl chain of 16 to 24 carbon atoms.

According to an aspect of the present subject matter, in said embodiment the long chain amine is having carbon atoms in the range of 10 to 18.

According to an aspect of the present subject matter, in said embodiment the ester of derivative of cashew nut shell liquid include ester of technical CNSL or hydrogenated CNSL or mixture thereof.

Esters of cashew nut shell liquid as described in present invention helps in preferentially bringing the acid-amine adduct from petroleum liquid to the close proximity of the metal surface for better film formation with larger area of the metal surfaces which is to be protected from corrosion.

According to an aspect of the present subject matter, in said embodiment the solvent is an aromatic solvent or an aliphatic solvent or a petroleum solvent.

The solvent suitable for use herein are selected from the group comprising of xylene, toluene, alkylated benzene, isopropanol, butanol, pentanol, pre-fractionator rerun column bottom, or a combination thereof.

In another embodiment, a process for preparation of disclosed corrosion inhibitor composition comprises dissolving a dimer fatty acid in a solvent to obtain a mixture (i), adding an alkyl amine to the mixture (i) in drop wise manner to obtain a mixture (ii), stirring the mixture (ii) at a temperature (x); adding ester of cashew nut shell liquid to the mixture (ii) to obtain a mixture (iii), and stirring the mixture (iii) at a temperature (y) to obtain the corrosion inhibitor.

According to an aspect of the present subject matter, in said embodiment the dimer fatty acid (DFA) is having alkyl chain of carbon atoms in the range of 30 to 50.

According to an aspect of the present subject matter, in said embodiment the solvent is an aromatic solvent or a aliphatic solvent or a petroleum solvent, selected from the group comprising of xylene, toluene, alkylated benzene, isopropanol, butanol, pentanol, pre-fractionator rerun column bottom, or a combination thereof.

According to an aspect of the present subject matter, in said embodiment the alkyl amine is a long chain amine having carbon atoms in the range of 10 to 18.

According to an aspect of the present subject matter, in said embodiment the ester of cashew nut shell liquid include ester of technical CNSL or hydrogenated CNSL or mixture and is represented by formula (I):

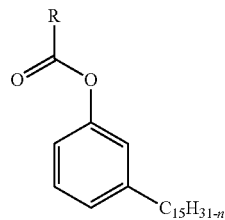

wherein, R is in the range C13 to C17 and n is 0 or 2 or 4 or 6.

According to an aspect of the present subject matter, in said embodiment the temperature (x) is maintained in the range of 40 to 150° C. during stirring.

According to an aspect of the present subject matter, in said embodiment the stirring of mixture (ii) is performed for a period in the range of 1 hour to 2 hours and stirring of mixture (iii) is performed for a period in the range of 0.5 hours to 1 hours.

According to an aspect of the present subject matter, in said embodiment the temperature (y) is maintained at 40 to 50° C. during stirring.

In yet another embodiment, a process for protecting internal metal surface of pipeline from corrosion due to a petroleum product, the process comprising adding the corrosion inhibitor as disclosed herein to the petroleum product to be stored or transported.

According to an aspect of the present subject matter, in said embodiment the concentration of the corrosion inhibitor in the petroleum product is in the range of 6 to 23 PPM.

According to an aspect of the present subject matter, in said embodiment the petroleum product is selected from the group comprising of kerosene, high speed diesel, naphtha and motor spirit.

According to an aspect of the present subject matter, in said embodiment the corrosion inhibitor is well compatible with the physio-chemical properties of the petroleum product.

The esters of cashew nut shell liquid suitable for use herein are synthesized by reacting non-hydrogenated or hydrogenated cashew nut shell liquid (CNSL) with $C_{13}$-$C_{18}$ fatty acids at temperature ranging from 50-150° C. CNSL olefinic side chain is fully hydrogenated with catalyst and then reacting the hydrogenated product with $C_{13}$-$C_{18}$ fatty acid. The $C_{13}$ to $C_{18}$ fatty acids could be pure or mixture of fatty acids from vegetable oils.

The dimer fatty acids suitable for use herein are dimer fatty acid of any fatty acid or mixture of fatty acids having alkyl chain of 30-50 carbon atoms. Some of the examples are tall oil, castor oil, linoleic, linolenic, stearic and ricinoleic acid etc. Long chain amines of range $C_{10}$ to $C_{18}$ were used herein to prepare corrosion inhibitor formulation.

An illustrative example of dimer fatty acid is represented by formula (II) and long chain alkyl amine is represented by formulae (III):

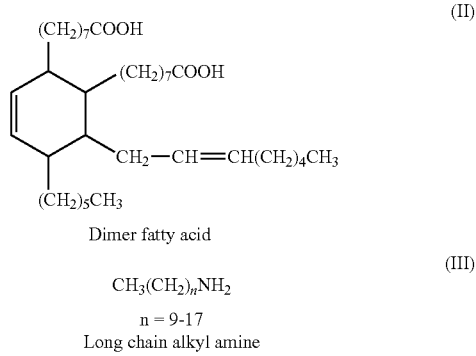

The solvent suitable to be used herein will be an aromatic solvent or a aliphatic solvent or a petroleum solvent. Some of the solvents are xylene, toluene, alkylated benzene, isopropanol, butanol, pentanol, pre-fractionator rerun column bottom, etc. or a combination thereof.

In an exemplary embodiment Technical CNSL is obtained after decarboxylation of natural CNSL which contains mainly cardanol (60-65%), cardol (15-20%), polymeric material (10%), and traces of methyl cardol. Hydrogenated CNSL is obtained by catalytic hydrogenation of cashew nut shell liquid generating a white waxy material, which is predominantly rich in tetrahydroanacardol.

In exemplary embodiments various combinations of corrosion inhibitor were prepared and their performance evaluation was carried out by NACE TM0172 test method which is an international standard test method to ascertain the corrosion inhibitor performance.

In an exemplary embodiment dimer fatty acid was dissolved in aromatic/aliphatic/petroleum solvent and alkyl amine was added drop wise to the mixture. After complete addition of amine the mixture was stirred at 50-150° C. for one hour. Then esters of naturally occurring alkylated phenol (CNSL) was added to the mixture and stirred for another half an hour at 40° C. to produce corrosion inhibitor formulation.

The improved corrosion inhibition capability of the developed corrosion inhibitor is obtained through synergy of components in the mixture. The components in composition act by chemically reacting with metal surface or as a solvating agent. The presence of long carbon chain in the amine molecule as well as dimer fatty acid helps the product for better miscibility in the petroleum liquid. Whereas the esters of alkylated phenol (cashew nut shell liquid) helps in extraction of the reaction product from the petroleum liquid and to carry out the reaction product to the close proximity of the metal surface for better adsorption therefore better film formation with larger area of the metal surfaces which is to be protected from corrosion.

The synergistic corrosion inhibiting additive composition as developed herein does not cause any changes in properties of fuel. The additive composition is effective in relatively low dosage.

The following are examples of the few corrosion inhibitor prepared:

EXAMPLE 1

The corrosion inhibitor was prepared by mixing 70 wt % of dimer fatty acid in 30 wt % of aromatic solvent at 50° C. for 60 minutes.

EXAMPLE 2

The corrosion inhibitor was prepared by mixing (a) 52.7% by weight of dimer fatty acid (DFA), (b) 17.3% by weight of $C_{12}$ amine, (c) 30% by weight of mixture of aromatic and aliphatic solvent in the ratio of 9:1; mixing is carried out at 50° C. for 60 minutes.

EXAMPLE 3

The corrosion inhibitor was prepared by mixing (a) 64.7% by weight of dimer fatty acid (DFA), (b) 5.3% by weight of Cu amine, (c) 30% by weight of mixture of aromatic and aliphatic solvent in the ratio of 9:1; mixing is carried out at 50° C. for 60 minutes.

EXAMPLE 4

The corrosion inhibitor was prepared by mixing (a) 50% by weight of dimer fatty acid (DFA), (b) 20% by weight of $C_{12}$ amine, (c) 30% by weight of mixture of aromatic and aliphatic in the ratio of 9:1; mixing is carried out at 50° C. for 60 minutes.

EXAMPLE 5

The corrosion inhibitor was prepared by mixing of (a) 64% by weight of dimer fatty acid (DFA), (b) 5.3% parts by weight of $C_{12}$ amine, (c) 30% by weight of aromatic solvent followed by addition of (d) 0.7% by weight of esters of naturally occurring alkylated phenol (CNSL) and stirring the mixture at 50° C. for 30 minutes.

EXAMPLE 6

The corrosion inhibitor was prepared by mixing of (a) 64% by weight of dimer fatty acid (DFA), (b) 0.7% by weight of $C_{12}$ amine, (c) 20% by weight of aromatic solvent followed by addition of (d) 5.3% by weight of esters of naturally occurring alkylated phenol (CNSL) and stirring the mixture at 50° C. for 30 minutes.

EXAMPLE 7

The corrosion inhibitor was prepared by mixing of (a) 64% by weight of dimer fatty acid (DFA), (b) 5.3% by weight of $C_{18}$ amine, (c) 30% by weight of pre-fractionator rerun column bottom followed by addition of (d) 0.7% by weight of esters of naturally occurring alkylated phenol (CNSL) and stirring the mixture at 100° C. for 30 minutes.

EXAMPLE 8

The corrosion inhibitor was prepared by mixing of (a) 64% by weight of dimer fatty acid (DFA), (b) 0.7% by weight of $C_{18}$ amine, (c) 5.3% by weight of naturally occurring alkylated phenol (CNSL), (d) 30% by weight of aromatic & aliphatic solvent in the ratio of 9:1 followed by addition of (e) 5.3% by weight of esters of naturally occurring alkylated phenol (CNSL) and stirring the mixture at 50° C. for 30 minutes.

EXAMPLE 9

The corrosion inhibitor was prepared by mixing of (a) 64% by weight of dimer fatty acid (DFA), (b) 0.7% by weight of $C_{16}$ amine, (c) 30% by weight of aromatic solvent at 50° C. for 60 minutes followed by addition of (d) 5.3% by weight of esters of naturally occurring alkylated phenol (CNSL) and stirring the mixture at 50° C. for 30 minutes.

EXAMPLE 10

The corrosion inhibitor was prepared by mixing of (a) 64% by weight of dimer fatty acid (DFA), (b) 0.7% by weight of $C_{16}$ amine, (c) 30% by weight of aromatic solvent followed by addition of (d) 5.3% by weight of esters of naturally occurring alkylated phenol (CNSL) and stirring the mixture at 150° C. for 30 minutes.

EXAMPLE 11

The corrosion inhibitor was prepared by mixing of (a) 50% by weight of dimer fatty acid (DFA), (b) 10% parts by weight of C12 amine, (c) 30% by weight of aromatic solvent followed by addition of (d) 10% by weight of esters of naturally occurring alkylated phenol (CNSL) and stirring the mixture at 50° C. for 30 minutes.

EXAMPLE 12

The corrosion inhibitor was prepared by mixing of (a) 90% by weight of dimer fatty acid (DFA), (b) 0.1% parts by weight of C12 amine, (c) 10% by weight of aromatic & aliphatic solvents in the ratio of 9:1 followed by addition of (d) 0.01% by weight of esters of naturally occurring alkylated phenol (CNSL) and stirring the mixture at 50° C. for 30 minutes.

Corrosion Inhibition Performance Study

An international standard test method for evaluating performance of corrosion inhibitor for pipeline is NACE standard TM 0172. This test involves rotating steel test specimen at 1000 rpm in presence of hydrocarbon, distilled water and air. Following the contact time period of 4 hr, the steel test specimen is examined for corrosion and a rating from A to E is assigned based upon the specimen surface corroded as per Table -1 described in the method. NACE rating of B+ or better is generally required for transportation of hydrocarbon via pipeline. Hydrocarbon liquids having NACE rating of C or poor usually require the addition of corrosion inhibitor to raise the NACE to an acceptable rating of B+ or better. However the performance of corrosion inhibitor is dependent on the rating of base fuel.

The ratings of corrosion are provided as per the following classification provided in NACE test method.

TABLE 1

Rating of the Test Specimen

| Rating | Percentage of Test Surface Corroded |
|---|---|
| A | 0 |
| B++ | Less than 0.1 (2 or 3 spots of no more than 1-mm [0.04-in.] diameter) |
| B+ | Less than 5 |

TABLE 1-continued

Rating of the Test Specimen

| Rating | Percentage of Test Surface Corroded |
|---|---|
| B | 5 to 25 |
| C | 25 to 50 |
| D | 50 to 75 |
| E | 75 to 100 |

The developed corrosion inhibitor of different combination were tested according to standard NACE TM 0172 method in kerosene of rating "E" to evaluate the performance of corrosion inhibitor compositions. The performance evaluation results are given in Table 2.

TABLE 2

| S. No | Corrosion inhibitor composition | Dose/Concentration (ppm) | Rating as per NACE TM0172 |
|---|---|---|---|
| 1 | Example 1 | 6 | C |
| 2 | Example 2 | 6 | B |
| 3 | Example 3 | 6 | B |
| 4 | Example 4 | 6 | B+ |
| 5 | Example 5 | 6 | B++ |
| 6 | Example 6 | 6 | B++ |
| 7 | Example 7 | 6 | B++ |
| 8 | Example 8 | 6 | B++ |
| 9 | Example 9 | 6 | B++ |
| 10 | Example 10 | 6 | B++ |
| 11 | Example 11 | 6 | B+ |
| 12 | Example 12 | 6 | B+ |
| 13 | Reference kerosene | 0 | E |

The NACE TM0172 test results in 'Table 2' demonstrates that the components of the corrosion inhibitor additive of the present invention exhibiting significant corrosion inhibition compare to the reference sample containing no corrosion inhibitor as per NACE TM 0172 test method at a concentration of 6 ppm. Dimer fatty acid as in 'Example 1' itself did not pass the standard test method at a concentration of 6 ppm. But addition of alkyl amine to dimer fatty acid shows improvement in the corrosion inhibition results as shown in the 'Example 2, 3 and 4'. Further improvement in corrosion inhibition performance is observed on addition of esters of naturally occurring alkylated phenol to the composition mixture. Better performance has been observed after the addition of esters of alkylated phenol to the composition of 'Example 5'. Esters of alkylated phenol facilitates in better film formation as explained earlier. Oleyl amine and hexadecyl amine have also shows excellent corrosion inhibition as shown in 'Example 8, 9 and 10'.

Compatibility Studies

The compatibility studies of the synthesized corrosion inhibitor were carried out after dozing 6 ppm of the developed corrosion inhibitor formulation in kerosene, HSD (High Speed Diesel), naphtha and MS. The physicochemical properties of the doped sample were tested in comparison with undoped/fresh sample and no change in characteristics of base fuel was observed. The results are shown in Table 3-6.

TABLE 3

Evaluation of physicochemical properties of fresh Kerosene and Kerosene with 6 ppm doped corrosion inhibitor:

| S. No | Properties | Method | Fresh Kerosene | Doped Kerosene |
|---|---|---|---|---|
| 1 | Appearance @ 25° C. | Visual | Colorless liquid | Colorless liquid |
| 2 | Sp Gravity @ 15° C. | D: 4052 | 0.8059 | 0.8060 |
| 3 | Density @ 15° C., gm/cc | D: 4052 | 0.8052 | 0.8053 |
| 4 | Distillation, % | D: 86 | Recovery 97.5 Residue 1.0 Loss 1.5 E.P.Cut 96.9 | Recovery 97.5 Residue 1.0 Loss 1.5 E.P.Cut 96.9 |
| 5 | Copper strip corrosion, No. | D: 130 | 1 | 1 |
| 6 | Inorganic acidity | IS: 1448 (P-2) | Nil | Nil |

TABLE 4

Evaluation of physico-chemical properties of fresh HSD and HSD doped with 6 ppm corrosion inhibitor:

| S. No | Properties | Method | Fresh HSD | Doped HSD |
|---|---|---|---|---|
| 1 | Appearance @ 25° C. | Manual | Yellow | Yellow |
| 2 | Sp Gravity @ 15° C. | D: 4052 | 0.8362 | 0.8363 |
| 3 | Density @ 15° C., gm/cc | D: 4052 | 0.8354 | 0.8355 |
| 4 | K.Vis @ 40° C., cSt | D: 445 | 3.077 | 3.144 |
| 5 | Distillation, % | D: 86 | Recovery 98.0 Residue 1.5 Loss 0.5 E.P.Cut 96.6 | Recovery 98.5 Residue 1.5 Loss 0.0 E.P.Cut 97.1 |
| 6 | Copper strip corrosion, No. | D: 130 | 1 | 1 |
| 7 | Inorganic acidity | IS:1448 (P-2) | Nil | Nil |
| 8 | Total sulphur, ppm | D: 2622 | <10 | <10 |

TABLE 5

Evaluation of physico-chemical properties of fresh naphtha and naphtha doped with 6 ppm corrosion inhibitor:

| S. No | Properties | Method | Fresh Naphtha | Doped Naphtha |
|---|---|---|---|---|
| 1 | Appearance @ 25° C. | Visual | Colorless liquid | Colorless liquid |
| 2 | Sp Gravity @ 15° C. | D: 4052 | 0.7326 | 0.7321 |
| 3 | Density @ 15° C., gm/cc | D: 4052 | 0.7319 | 0.7316 |
| 4 | Distillation, % | D: 86 | Recovery 96.9 Residue 1.0 Loss 2.1 E.P.Cut 96.7 | Recovery 97.1 Residue 1.0 Loss 1.9 E.P.Cut 96.9 |
| 5 | Copper strip corrosion, No. | D: 130 | 1 | 1 |

TABLE 6

Evaluation of physico-chemical properties of fresh MS and MS doped with 6 ppm corrosion inhibitor:

| S. No. | Properties | Method | Fresh MS | | Treated MS | |
|---|---|---|---|---|---|---|
| 1 | Appearance @ 25° C. | Visual | Orange | | Orange | |
| 2 | Sp Gravity @ 15° C., gm/cc | D: 4052 | 0.7662 | | 0.7520 gm/cc | |
| 3 | Distillation, % | D: 86 | Recovery | 97.0 | Recovery | 96.9 |
|   |   |   | Residue | 1.5 | Residue | 1.5 |
|   |   |   | Loss | 1.5 | Loss | 1.6 |
| 4 | FBP | D: 86 | 187 | | 187 | |
| 5 | Copper strip corrosion, No. | D: 130 | 1 | | 1 | |
| 6 | Sulphur content (ppm) | XRF | 38 | | 40 | |

The compatibility study results shows that the developed corrosion inhibitor composition is well compatible with the petroleum liquids (kerosene, HSD, naphtha and MS) as no change in properties of these petroleum liquids was observed after doping 6 ppm of corrosion inhibitor composition.

Advantages of the Present Invention

The invention as disclosed herein describes a single step reaction to produce the corrosion inhibitor from dimer fatty acid ($C_{30}$-$C_{50}$) and long chain amine ($C_{10}$-$C_{18}$) in the presence of esters of naturally occurring alkylated phenol and aromatic, aliphatic solvent like xylene, toluene, alkylated benzene, isopropanol, butanol, pentanol, pre-fractionator rerun column bottom (petroleum solvent) etc.

The corrosion inhibitor as disclosed herein is highly effective even at low dosage for application as corrosion inhibitor for storage and transportation of hydrocarbon products.

The process as described herein for the production of disclosed corrosion inhibitor is simple to commercial scale up.

While specific language has been used to describe the present subject matter, any limitations arising on account thereto, are not intended. As would be apparent to a person in the art, various working modifications may be made to the method in order to implement the inventive concept as taught herein. The drawings and the foregoing description give examples of embodiments. Those skilled in the art will appreciate that one or more of the described elements may well be combined into a single functional element. Alternatively, certain elements may be split into multiple functional elements. Elements from one embodiment may be added to another embodiment.

The invention claimed is:

1. A corrosion inhibitor composition, comprising:
   a. a ester of cashew nut shell liquid (CNSL) represented by formula (I):

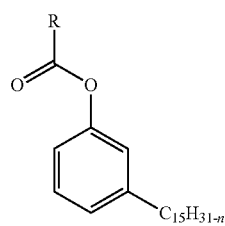

wherein, R is in the range C13 to C17 and n is 0 or 2 or 4 or 6;
   b. a dimer fatty acid (DFA);
   c. a long chain amine; and
   d. a solvent.

2. The composition as claimed in claim 1, wherein the ester of cashew nut shell liquid (CSNL) is present in the range of 0.01 to 10% by weight.

3. The composition as claimed in claim 1, wherein the dimer fatty acid (DFA) is present in the range of 50 to 95% by weight.

4. The composition as claimed in claim 1, wherein the long chain amine is present in the range of 0.1 to 20% by weight.

5. The composition as claimed in claim 1, wherein the solvent is present in the range of 10 to 45% by weight.

6. The composition as claimed in claim 1, wherein the dimer fatty acid (DFA) is having alkyl chain of carbon atoms in the range of 30 to 50.

7. An additive composition as claimed in claim 1, wherein the dimer fatty acid (DFA) is a mixture of fatty acids having alkyl chain of 16 to 24 carbon atoms.

8. The composition as claimed in claim 1, wherein the long chain amine is having carbon atoms in the range of 10 to 18.

9. The composition as claimed in claim 1, wherein the ester of cashew nut shell liquid include ester of technical CNSL or hydrogenated CNSL or mixture thereof.

10. The composition as claimed in claim 1, wherein the solvent is an aromatic solvent or a aliphatic solvent or a petroleum solvent.

11. The composition as claimed in claim 10, wherein the solvent is selected from the group comprising of xylene, toluene, alkylated benzene, isopropanol, butanol, pentanol, pre-fractionator rerun column bottom, or a combination thereof.

12. A process for preparation of a corrosion inhibitor composition, the process comprising:
   a. dissolving a dimer fatty acid in a solvent to obtain a mixture (i);
   b. adding an alkyl amine to the mixture (i) in drop wise manner to obtain a mixture (ii);
   c. stirring the mixture (ii) at a temperature (x);
   d. adding ester of cashew nut shell liquid to the mixture (ii) of step (c.) to obtain a mixture (iii); and
   e. stirring the mixture (iii) at a temperature (y) to obtain the corrosion inhibitor.

13. The process as claimed in claim 12, wherein the dimer fatty acid (DFA) is having alkyl chain of carbon atoms in the range of 30 to 50.

14. The process as claimed in claim 12, wherein the solvent is an aromatic solvent or a aliphatic solvent or a petroleum solvent, selected from the group comprising of xylene, toluene, alkylated benzene, isopropanol, butanol, pentanol, pre-fractionator rerun column bottom, or a combination thereof.

15. The process as claimed in claim 12, wherein the alkyl amine is a long chain amine having carbon atoms in the range of 10 to 18.

16. The process as claimed in claim 12, wherein the ester of cashew nut shell liquid include ester of technical CNSL or hydrogenated CNSL or mixture and is represented by formula (I):

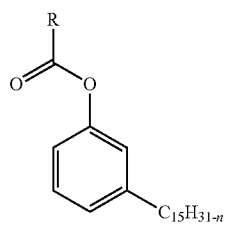

wherein, R is in the range C13 to C17 and n is 0 or 2 or 4 or 6.

17. The process as claimed in claim 12, wherein the temperature (x) is maintained in the range of 40 to 150° C. during stirring.

18. The process as claimed in claim 12, wherein the stirring in step (.c) is performed for a period in the range of 1 hours to 2 hours and stirring in step (.e) is performed for a period in the range of 0.5 hours to 1 hours.

19. The process as claimed in claim 12, wherein the temperature (y) is maintained at 40 to 50° C. during stirring.

20. A process for protecting internal metal surface of pipeline from corrosion due to a petroleum product, the process comprising adding the corrosion inhibitor of claim 1 to the petroleum product to be stored or transported.

21. The process as claimed in claim 20, wherein the concentration of the corrosion inhibitor in the petroleum product is in the range of 6 to 23 PPM.

22. The process as claimed in claim 20, wherein the petroleum product is selected from the group comprising of kerosene, high speed diesel, naphtha and motor spirit.

23. The process as claimed in claim 20, wherein the corrosion inhibitor is well compatible with the physiochemical properties of the petroleum product.

* * * * *